United States Patent
Tucho

[11] Patent Number: 6,135,550
[45] Date of Patent: Oct. 24, 2000

[54] BICYCLE SEAT

[76] Inventor: Tafesse Tucho, 2245 W. Farewell Ave., Chicago, Ill. 60645

[21] Appl. No.: 09/283,804

[22] Filed: Apr. 1, 1999

[51] Int. Cl.⁷ ........................................... B62J 1/26
[52] U.S. Cl. .................... 297/199; 297/200; 297/195.1; 297/452.41; 297/284.6; 297/284.1; 297/284.3; 5/654; 5/653
[58] Field of Search ................................. 297/199, 200, 297/195.1, 284.1, 284.3, 452.41; 5/654, 653, 708

[56] References Cited

U.S. PATENT DOCUMENTS

| | | | |
|---|---|---|---|
| 3,093,407 | 6/1963 | Wilson | 5/653 X |
| 3,112,956 | 12/1963 | Schick et al. | 5/654 X |
| 4,063,775 | 12/1977 | Mesinger | 297/201 |
| 4,132,228 | 1/1979 | Green | 297/284.3 X |
| 4,370,769 | 2/1983 | Herzig et al. | 5/654 |
| 4,504,089 | 3/1985 | Calvert et al. | 297/214 |
| 4,957,286 | 9/1990 | Persons, II et al. | 297/199 X |
| 5,020,852 | 6/1991 | Marion | 297/200 |
| 5,121,962 | 6/1992 | Weber et al. | 297/199 X |
| 5,147,685 | 9/1992 | Hanson | 428/189 |
| 5,165,752 | 11/1992 | Terry | 297/214 |
| 5,318,344 | 6/1994 | Wang | 297/199 |
| 5,330,249 | 7/1994 | Weber et al. | 297/199 X |
| 5,348,369 | 9/1994 | Yu | 297/195.1 X |
| 5,412,822 | 5/1995 | Kelly | 5/654 X |
| 5,487,197 | 1/1996 | Iskra, Jr. et al. | 297/452.41 X |
| 5,524,961 | 6/1996 | Howard | 297/199 |
| 5,548,948 | 8/1996 | Smith et al. | 5/654 X |
| 5,558,395 | 9/1996 | Huang | 297/199 |
| 5,634,685 | 6/1997 | Herring | 297/217.3 X |
| 5,658,050 | 8/1997 | Lorbiecki | 297/284.6 X |
| 5,670,232 | 9/1997 | Bigolin | 297/199 X |
| 5,697,691 | 12/1997 | Shavitz | 297/250.1 |
| 5,711,573 | 1/1998 | Daniels | 297/199 |
| 5,738,406 | 4/1998 | Deus | 297/200 |
| 5,797,155 | 8/1998 | Maier et al. | 297/284.6 X |

FOREIGN PATENT DOCUMENTS

| | | | |
|---|---|---|---|
| 86/07528 | 12/1986 | WIPO | 5/653 |

*Primary Examiner*—Peter M. Cuomo
*Assistant Examiner*—Rodney B. White
*Attorney, Agent, or Firm*—Joseph N. Breaux

[57] ABSTRACT

A bicycle seat that includes a foam seat cushion member having an inflatable edge cushion provided around the back and side edges of an upper cushion surface thereof and a centrally positioned dual lobe inflatable buttocks cushion.

1 Claim, 2 Drawing Sheets

BICYCLE SEAT

TECHNICAL FIELD

The present invention relates to bicycle seats and more particularly to a bicycle seat that includes a foam seat cushion member attached to an upper surface of a rigid seat cushion support plate; a U-shaped, inflatable edge cushion provided around the back and side edges of an upper cushion surface of the foam seat cushion member; an inflatable edge cushion inflation pump; an inflatable edge cushion deflation valve; a centrally positioned dual lobe inflatable buttocks cushion; a buttocks cushion inflation pump; a buttocks cushion deflation valve; and a four spring shock absorbing seat pipe connecting structure with each of the four springs connected to a bottom surface of the rigid seat cushion support plate and a seat pipe connecting clamp supported between the four springs.

BACKGROUND ART

Narrow, hard bicycle seats can be uncomfortable for some individuals. It would be a benefit to these individuals to have a wide bicycle seat that included three cushion elements for cushioning and supporting the bike rider's buttocks. Because individuals have different sized and shaped buttocks, it would be a further benefit to have a bike seat that included at least one user adjustable cushion element.

GENERAL SUMMARY DISCUSSION OF INVENTION

It is thus an object of the invention to provide a bicycle seat that includes three cushion elements for cushioning and supporting the bike rider's buttocks.

It is a further object of the invention to provide a bicycle seat that includes at least one user adjustable cushion element.

It is a still further object of the invention to provide a bicycle seat that includes a foam seat cushion member attached to an upper surface of a rigid seat cushion support plate; a U-shaped, inflatable edge cushion provided around the back and side edges of an upper cushion surface of the foam seat cushion member; an inflatable edge cushion inflation pump; an inflatable edge cushion deflation valve; a centrally positioned dual lobe inflatable buttocks cushion; a buttocks cushion inflation pump; a buttocks cushion deflation valve; and a four spring shock absorbing seat pipe connecting structure with each of the four springs connected to a bottom surface of the rigid seat cushion support plate and a seat pipe connecting clamp supported between the four springs.

It is a still further object of the invention to provide a bicycle seat that accomplishes all or some of the above objects in combination.

Accordingly, a bicycle seat is provided. The bicycle seat includes a foam seat cushion member attached to an upper surface of a rigid seat cushion support plate; a U-shaped, inflatable edge cushion provided around the back and side edges of an upper cushion surface of the foam seat cushion member; an inflatable edge cushion inflation pump; an inflatable edge cushion deflation valve; a centrally positioned dual lobe inflatable buttocks cushion; a buttocks cushion inflation pump; a buttocks cushion deflation valve; and a four spring shock absorbing seat pipe connecting structure with each of the four springs connected to a bottom surface of the rigid seat cushion support plate and a seat pipe connecting clamp supported between the four springs.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
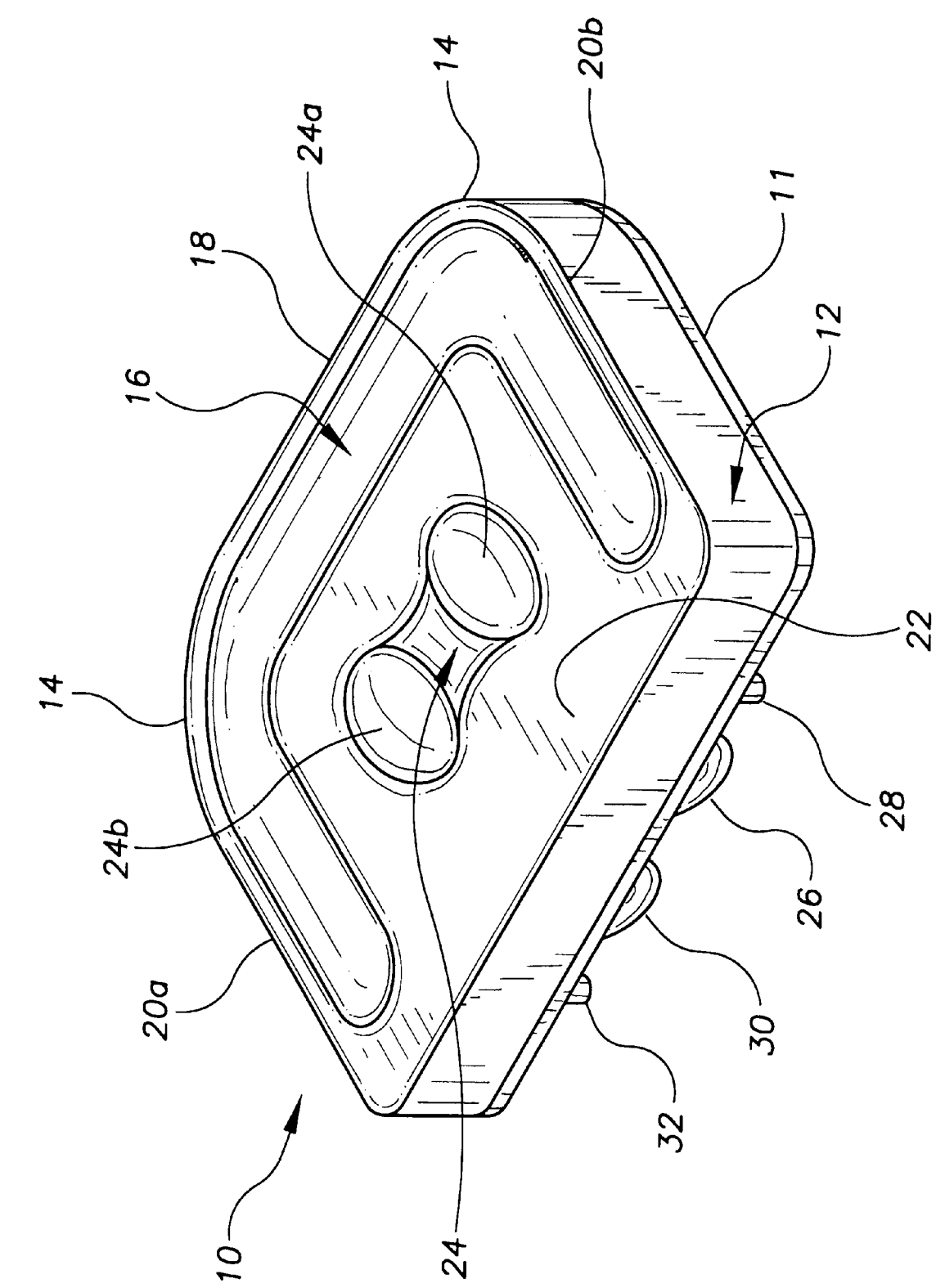
FIG. 1 is a perspective view of an exemplary embodiment of the bicycle seat of the present invention showing the foam seat cushion member; the U-shaped, inflatable edge cushion provided around the back and side edges of the upper surface of the foam seat cushion member; the inflatable edge cushion inflation pump; the inflatable edge cushion deflation valve; the centrally positioned dual lobe inflatable buttocks cushion; the buttocks cushion inflation pump; and the buttocks cushion deflation valve.
Figure 2:
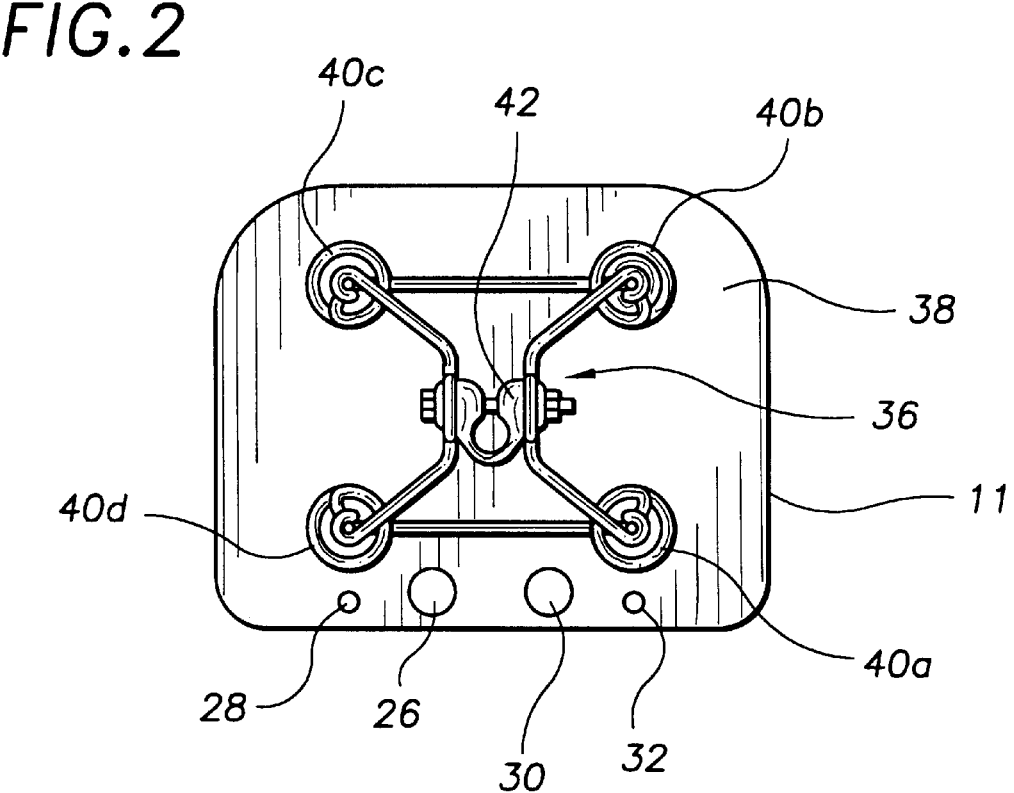
FIG. 2 is an underside plan view of the exemplary bicycle seat of FIG. 1 showing the rigid seat cushion support plate to which the foam seat cushion member is secured; the quadruple spring shock absorbing seat pipe connecting structure with each of the four springs connected to the bottom surface of the rigid seat cushion support plate and the seat pipe connecting clamp supported between the four springs; the inflatable edge cushion inflation pump; the inflatable edge cushion deflation valve; the buttocks cushion inflation pump; and the buttocks cushion deflation valve.

FIG. 1 shows an exemplary embodiment of the bicycle seat of the present invention generally designated 10. Bicycle seat 10 includes a rigid seat cushion support plate 11; a substantially rectangular foam seat cushion member, generally designated 12, with curved back corners 14 formed thereon and supported on an upper surface of the rigid cushion support plate; a U-shaped, inflatable edge cushion, generally designated 16, provided around the back and side edges 18,20a,20b respectively, of an upper surface 22 of foam seat cushion member 12; a centrally positioned dual lobe inflatable buttocks cushion, generally designated 24, having a left buttocks support lobe 24a and a right buttocks support lobe 24b; with reference now to FIG. 2, an inflatable edge cushion inflation pump 26 in air flow connection with inflatable edge cushion 16 (FIG. 1); a screw cap type, inflatable edge cushion deflation valve 28 in air flow connection with the inflatable edge cushion 16 (FIG. 1); a buttocks cushion inflation pump 30 in air flow connection with inflatable buttocks cushion 24 (FIG. 1); a screw cap type buttocks cushion deflation valve 32 in air flow connection with inflatable buttocks cushion 24 (FIG. 1); and a four spring shock absorbing seat pipe connecting structure, generally designated 36 secured to an undersurface 38 of rigid seat cushion support plate 11. Seat pipe connecting structure 36 has four springs 40a–d each secured to undersurface 38 of rigid seat cushion support plate 11 and attached to a conventional seat pipe connecting clamp 42.

Figure 3:
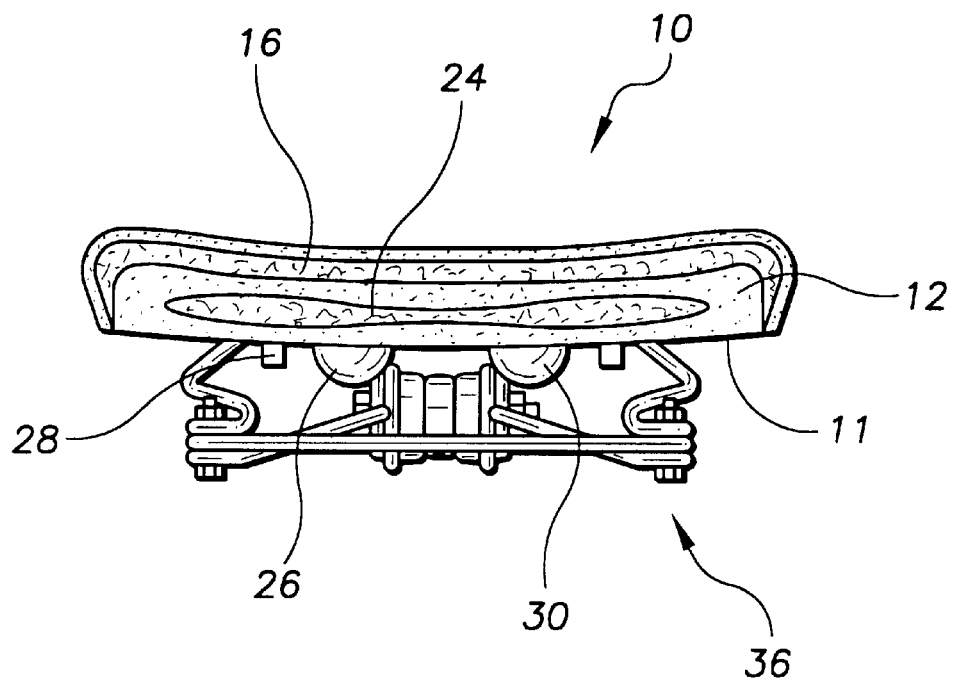
FIG. 3 is a front plan view of the bicycle seat of FIG. 1 showing the foam seat cushion member supported on the rigid seat cushion support plate; the U-shaped, inflatable edge cushion; the inflatable edge cushion inflation pump; the inflatable edge cushion deflation valve; the centrally position dual lobe inflatable buttocks cushion; the buttocks cushion inflation pump; the buttocks cushion deflation valve; and the quadruple spring shock absorbing seat pipe connecting structure with each of the four springs connected to the bottom surface of the rigid seat cushion support plate and the seat pipe connecting clamp supported between the four springs.

FIG. 3 is a front view of bicycle seat 10 showing foam seat cushion member 12 supported on rigid seat cushion support plate 11; U-shaped, inflatable edge cushion 16; inflatable edge cushion inflation pump 26; inflatable edge cushion deflation valve 28; the centrally position dual lobe inflatable buttocks cushion 24; buttocks cushion inflation pump 30; buttocks cushion deflation valve 32; and four spring shock absorbing seat pipe connecting structure 36. In use, the user can adjust the air pressure within U-shaped, inflatable edge cushion 16 with inflatable edge cushion inflation pump 26 and inflatable edge cushion deflation valve 28; and the air pressure within centrally position dual lobe inflatable buttocks cushion 24 with buttocks cushion inflation pump 30 and buttocks cushion deflation valve 32.

It can be seen from the preceding description that a bicycle seat has been provided that includes three cushion elements for cushioning and supporting the bike rider's buttocks; that includes at least one user adjustable cushion element; and that includes a foam seat cushion member attached to an upper surface of a rigid seat cushion support plate; a U-shaped, inflatable edge cushion provided around the back and side edges of an upper cushion surface of the foam seat cushion member; an inflatable edge cushion inflation pump; an inflatable edge cushion deflation valve; a centrally positioned dual lobe inflatable buttocks cushion; a buttocks cushion inflation pump; a buttocks cushion deflation valve; and a four spring shock absorbing seat pipe connecting structure with each of the four springs connected to a bottom surface of the rigid seat cushion support plate and a seat pipe connecting clamp supported between the four springs.

It is noted that the embodiment of the bicycle seat described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A bicycle seat comprising:

a foam seat cushion member attached to an upper surface of a rigid seat cushion support plate;

a U-shaped, inflatable edge cushion provided around back and side edges of an upper cushion surface of said foam seat cushion member;

an inflatable edge cushion inflation pump connected to said U-shaped inflatable edge cushion;

an inflatable edge cushion deflation valve connected to said U-shaped inflatable edge cushion;

a centrally located positioned dual lobe inflatable buttocks cushion provided on said upper cushion surface of said foam seat cushion member; a buttocks cushion inflation pump connected to said dual lobe inflatable buttocks cushion;

buttocks cushion deflation valve connected to said dual lobe inflatable buttocks cushion; and a four spring shock absorbing seat pipe connecting structure with each of said four springs connected to a bottom surface of said rigid seat cushion support plate and a seat pipe connecting clamp supported between said four springs.

* * * * *